United States Patent
Tsai et al.

(10) Patent No.: US 11,990,761 B2
(45) Date of Patent: May 21, 2024

(54) POWER SUPPLY SYSTEM WITH CURRENT SHARING AND METHOD OF CURRENT SHARING THE SAME

(71) Applicant: FSP TECHNOLOGY INC., Taoyuan (TW)

(72) Inventors: Chien-Li Tsai, Taoyuan (TW); Chih-Fan Lin, Taoyuan (TW); Chih-Hsien Hsieh, Taoyuan (TW)

(73) Assignee: FSP TECHNOLOGY INC., Taoyuan (TW)

( * ) Notice: Subject to any disclaimer, the term of this patent is extended or adjusted under 35 U.S.C. 154(b) by 8 days.

(21) Appl. No.: 17/984,516

(22) Filed: Nov. 10, 2022

(65) Prior Publication Data
US 2023/0336001 A1    Oct. 19, 2023

(30) Foreign Application Priority Data

Apr. 19, 2022 (TW) ................................. 111114900

(51) Int. Cl.
*H02J 3/46* (2006.01)
*H02J 3/38* (2006.01)
*H02M 7/12* (2006.01)

(52) U.S. Cl.
CPC ............... *H02J 3/46* (2013.01); *H02J 3/381* (2013.01); *H02M 7/12* (2013.01)

(58) Field of Classification Search
CPC ............... H02J 3/46; H02J 3/381; H02M 7/12
USPC ............................................................. 307/51
See application file for complete search history.

(56) References Cited

U.S. PATENT DOCUMENTS

2017/0237285 A1* 8/2017 Wang ................... H02J 9/061
307/66

* cited by examiner

*Primary Examiner* — Hal Kaplan
(74) *Attorney, Agent, or Firm* — Chun-Ming Shih; HDLS IPR SERVICES

(57) ABSTRACT

A power supply system with current sharing includes a current sharing bus, a plurality of power supply units, and a plurality of controllers. The power supply units are connected to each other through the current sharing bus. Each power supply unit provides a current sharing signal value to the current sharing bus, and provides an output current to a load. Each controller receives current sharing signal values provided from other power supply units and current signal values corresponding to the output currents. When determining that the current signal value is less than a reference current sharing signal value, the controller increases an output voltage of the power supply unit to increase the output current. Otherwise, the controller decreases the output voltage to decrease the output current so that so that the output currents of the power supply units are shared to supply power to the load.

18 Claims, 2 Drawing Sheets

POWER SUPPLY SYSTEM WITH CURRENT SHARING AND METHOD OF CURRENT SHARING THE SAME

BACKGROUND

Technical Field

The present disclosure relates to a power supply system and a method of current controlling the same, and more particularly to a power supply system and a method of current sharing the same.

Description of Related Art

The statements in this section merely provide background information related to the present disclosure and do not necessarily constitute prior art.

When multiple power modules (power supply units) are powered in parallel, since circuit parameters thereof cannot be completely consistent, the phenomenon of uneven distribution of the load current of the modules is prone to occur, that is, the problem of current imbalance is caused so the demand and research of current sharing control have gradually been paid attention.

The commonly method for current sharing of existing power supplies in parallel is the maximum current sharing method through a current sharing bus. Based on the power module with the maximum output current in the parallel system, output voltages of other power modules are increased for current sharing control, but the voltages cannot be adjusted to decrease. Moreover, using an analog operational amplifier will have larger errors under light-load operation. Therefore, the existing current sharing control methods cannot achieve the advantages of accurate and fast dynamic response.

SUMMARY

An objective of the present disclosure is to provide a power supply system with current sharing to solve the above-mentioned problems.

In order to the objective, the power supply system with current sharing includes a current sharing bus, a plurality of power supply units, and a plurality of controllers. The power supply units are connected to each other through the current sharing bus.

Each power supply unit provides a current sharing signal value corresponding to a power supply ratio to the current sharing bus, and provides an output current to a load. The controllers are respectively coupled to the power supply units. Each controller receives current sharing signal values provided from other power supply units and current signal values corresponding to the output currents, and compares a reference current sharing signal value of the current sharing signal values with the current signal values. When the controller determines that the current signal value is less than the reference current sharing signal value, the controller increases an output voltage of the power supply unit to increase the output current; when the controller determines that the current signal value is greater than the reference current sharing signal value, the controller decreases the output voltage to decrease the output current so that the output currents of the power supply units are shared to supply power to the load.

In one embodiment, each controller adaptively sets the power supply ratio corresponding to the current sharing signal value so as to control the power supply unit to output the corresponding output current according to the power supply ratios.

In one embodiment, each controller adaptively sets the power supply ratio corresponding to the current sharing signal value by software or firmware.

In one embodiment, the power supply ratio corresponding to the current sharing signal value is set before the power supply unit leaves the factory.

In one embodiment, each controller builds a relationship between the current sharing signal values and the power supply ratios through a look-up table.

In one embodiment, if rated output powers of these power supply units are identical, the output currents of the power supply units are shared in the identical output current to supply power to the load according to the power supply ratios.

In one embodiment, if rated output powers of these power supply units are different, the output currents of the power supply units are shared in the proportional output current to supply power to the load according to the power supply ratios.

In one embodiment, the reference current sharing signal value is the maximum value, the minimum value, or an average value of the current sharing signal values.

In one embodiment, the power supply unit comprises at least one switch component. The controller provides a switch control signal to control the switching of the at least one switch component to increase or decrease the output voltage.

In one embodiment, the switch control signal is a pulse-width modulation signal.

Accordingly, the proposed power supply system with current sharing achieves the following technical features and technical effects: 1. By means of bi-directionally adjusting the output voltage (adjusting the output voltage to increase and decrease), it can effectively allow each power supply unit to quickly achieve current sharing. 2. Based on digital software or firmware design, it can effectively solve the disadvantage that the analog operational amplifier will have large error under light-load operation. 3. The power supply ratios corresponding to the current sharing signal values are set (compensated) adaptively, and therefore under the full (wide) range of output voltage, the accuracy of the current sharing control can be increased, which meets the requirement of 2% current sharing. 4. The advantages of fast dynamic response can effectively overcome the instantaneous dynamic high current requirements of the latest CRPS design specifications.

Another objective of the present disclosure is to provide a method of current sharing a power supply system to solve the above-mentioned problems.

In order to accomplish the objective, the power supply system includes a current sharing bus and a plurality of power supply units connected to each other through the current sharing bus, each power supply unit provides a current sharing signal value corresponding to a power supply ratio to the current sharing bus, and provides an output current to a load. The power supply system with current sharing includes a current sharing bus, a plurality of power supply units, and a plurality of controllers. The method includes steps of: receiving current sharing signal values provided from other power supply units and current signal values corresponding to the output currents, comparing a reference current sharing signal value of the current sharing signal values with the current signal values, increasing an output voltage of the power supply unit to increase the output current when determining that the current signal value is less than the reference current sharing signal value, and decreasing the output voltage to decrease the output current when determining that the current signal value is greater than the reference current sharing signal value.

In one embodiment, the method further includes a step of: adaptively setting the power supply ratio corresponding to the current sharing signal value so as to control the power supply unit to output the corresponding output current according to the power supply ratios.

In one embodiment, adaptively setting the power supply ratio corresponding to the current sharing signal value by software or firmware.

In one embodiment, setting the power supply ratio corresponding to the current sharing signal value before the power supply unit leaves the factory.

In one embodiment, the method further includes a step of: sharing the output currents of the power supply units in the identical output current to supply power to the load according to the power supply ratios if rated output powers of these power supply units are identical.

In one embodiment, the method further includes a step of: sharing the output currents of the power supply units in the proportional output current to supply power to the load according to the power supply ratios if rated output powers of these power supply units are different.

In one embodiment, the reference current sharing signal value is the maximum value, the minimum value, or an average value of the current sharing signal values.

In one embodiment, the power supply unit includes at least one switch component, and the method further includes a step of: providing a switch control signal to control the switching of the at least one switch component to increase or decrease the output voltage.

Accordingly, the proposed method of current sharing the power supply system achieves the following technical features and technical effects: 1. By means of bi-directionally adjusting the output voltage (adjusting the output voltage to increase and decrease), it can effectively allow each power supply unit to quickly achieve current sharing. 2. Based on digital software or firmware design, it can effectively solve the disadvantage that the analog operational amplifier will have large error under light-load operation. 3. The power supply ratios corresponding to the current sharing signal values are set (compensated) adaptively, and therefore under the full (wide) range of output voltage, the accuracy of the current sharing control can be increased, which meets the requirement of 2% current sharing. 4. The advantages of fast dynamic response can effectively overcome the instantaneous dynamic high current requirements of the latest CRPS design specifications.

It is to be understood that both the foregoing general description and the following detailed description are exemplary, and are intended to provide further explanation of the present disclosure as claimed. Other advantages and features of the present disclosure will be apparent from the following description, drawings and claims.

BRIEF DESCRIPTION OF DRAWINGS

The present disclosure can be more fully understood by reading the following detailed description of the embodiment, with reference made to the accompanying drawing as follows.

DETAILED DESCRIPTION

Figure 1:
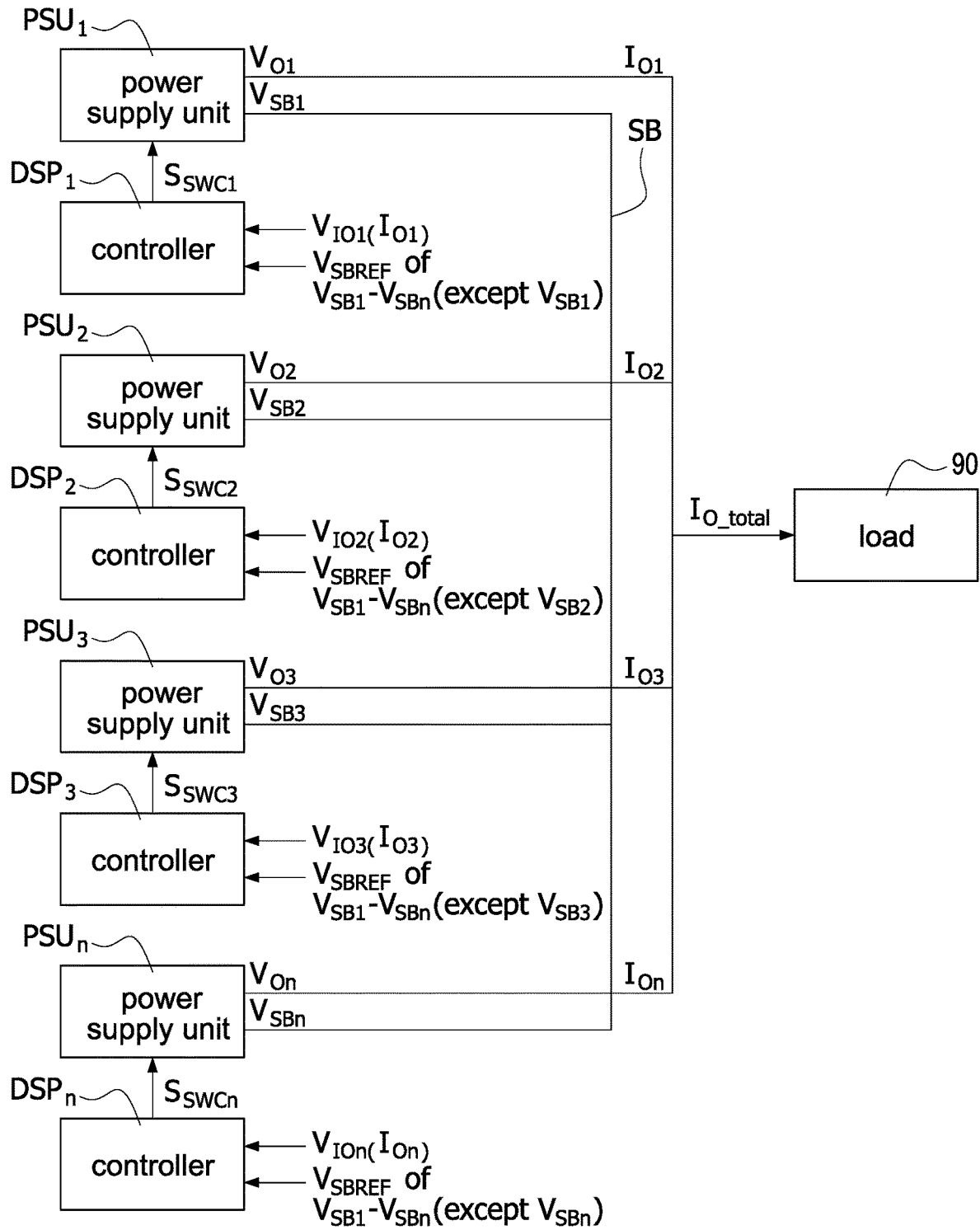
FIG. 1 is a block diagram of a power supply system with current sharing according to the present disclosure.

Reference will now be made to the drawing figures to describe the present disclosure in detail. It will be understood that the drawing figures and exemplified embodiments of present disclosure are not limited to the details thereof.

The power supply system with current sharing of the present disclosure may be applied to, for example, but not limited to, power supplies in related fields such as servers, network communications, etc., for example, through a plurality of parallel power supplies, as a redundant power supply structure.

Please refer to FIG. 1, which shows a power supply system with current sharing according to the present disclosure. The power supply system with current sharing includes a current sharing bus SB, a plurality of power supply units $PSU_1$-$PSU_n$, and a plurality of controllers $DSP_1$-$DSP_n$.

The power supply units $PSU_1$-$PSU_n$ are connected to each other through the current sharing bus SB. As shown in FIG. 1, output sides of the power supply units $PSU_1$-$PSU_n$ are respectively connected to the current sharing bus SB. Each power supply unit $PSU_1$-$PSU_n$ provides a current sharing signal value $V_{SB1}$-$V_{SBn}$ corresponding to a power supply ratio to the current sharing bus SB. For example, the first power supply unit $PSU_1$ provides a first current sharing signal value $V_{SB1}$ corresponding to the power supply ratio according to its power supply ratio to the load 90, which means that the power supply ratio and the first current sharing signal value $V_{SB1}$ are in a proportional relationship. The following Table 1 (taking the first power supply unit $PSU_1$ as an example) illustrates, but does not limit the present disclosure. Furthermore, the relationship between the power supply ratio and the first current sharing signal value $V_{SB1}$ is not limited to the discrete relationships shown in Table 1. Ideally, the relationship between each power supply ratio and the first current sharing signal value $V_{SB1}$ can be realized.

TABLE 1

| power supply ratio | first current sharing signal value $V_{SB1}$ (volts) |
|---|---|
| 0% | 0 |
| 20% | 1.6 |
| 25% | 2 |
| 50% | 4 |
| 75% | 6 |
| 80% | 6.4 |
| 100% | 8 |

Similarly, the second power supply unit $PSU_2$ provides a second current sharing signal value $V_{SB2}$ corresponding to the power supply ratio according to its power supply ratio to the load 90; the third power supply unit $PSU_3$ provides a third current sharing signal value $V_{SB3}$ corresponding to the power supply ratio according to its power supply ratio to the load 90, so on and so forth.

The power supply units PSU1-PSUn provide output current IO1-IOn to the load 90. As shown in FIG. 1, the first power supply unit PSU1 provides a first output current IO1 to (supply power to) the load 90. Similarly, the second power supply unit PSU2 provides a second output current IO2 to the load 90; the third power supply unit PSU3 provides a third output current IO3 to the load 90, so on and so forth. Therefore, a total current $I_{O\ total}$ of the sum of the output currents $I_{O1}$-$I_{On}$ is used to supply power to the load 90.

The controllers $DSP_1$-$DSP_n$ are respectively coupled to the power supply units $PSU_1$-$PSU_n$, that is, a first controller $DSP_1$ is coupled to the first power supply unit $PSU_1$; a second controller $DSP_2$ is coupled to the second power supply unit $PSU_2$; a third controller $DSP_3$ is coupled to the third power supply unit $PSU_3$; so on and so forth.

Each controller $DSP_1$-$DSP_n$ receives current sharing signal values $V_{SB1}$-$V_{SBn}$ provided from other power supply units $PSU_1$-$PSU_n$ and current signal values $V_{IO1}$-$V_{IOn}$ corresponding to the output currents $I_{O1}$-$I_{On}$. As mentioned above, since each power supply unit $PSU_1$-$PSU_n$ provides its own current sharing signal value $V_{SB1}$-$V_{SBn}$ to the current sharing bus SB, in other words, the current sharing signal value $V_{SB1}$-$V_{SBn}$ of each power supply unit $PSU_1$-$PSU_n$ may be acquired from the current sharing bus SB, the first controller $DSP_1$ may receive the current sharing signal values $V_{SB1}$-$V_{SBn}$ provided by other power supply units $PSU_1$-$PSU_n$ other than itself from the current sharing bus SB. That is, the first controller $DSP_1$ may acquire the second current sharing signal value $V_{SB2}$, the third current sharing signal value $V_{SB3}$, to the Nth current sharing signal value $V_{SBn}$. Similarly, the second controller $DSP_2$ may acquire the first current sharing signal value $V_{SB1}$, the third current sharing signal value $V_{SB3}$, to the Nth current sharing signal value $V_{SBn}$, so on and so forth.

Each controller $DSP_1$-$DSP_n$ compares a reference current sharing signal value $V_{SBREF}$ of the current sharing signal values $V_{SB1}$-$V_{SBn}$ with the current signal values $V_{IO1}$-$V_{IOn}$. In particular, the reference current sharing signal value $V_{SBREF}$ is the maximum value, the minimum value, or an average value of the current sharing signal values $V_{SB1}$-$V_{SBn}$, however, this does not limit the present disclosure. Therefore, the first controller $DSP_1$ compares the reference current sharing signal value $V_{SBREF}$ with the first current signal values $V_{IO1}$; the second controller $DSP_2$ compares the reference current sharing signal value $V_{SBREF}$ with the second current signal values $V_{IO2}$; the third controller $DSP_3$ compares the reference current sharing signal value $V_{SBREF}$ with the third current signal values $V_{IO3}$, so on and so forth. The detailed and specific description will be described later.

Afterward, when the controller $DSP_1$-$DSP_n$ determines that the current signal value $V_{IO1}$-$V_{IOn}$ is less than the reference current sharing signal value $V_{SBREF}$, the controller $DSP_1$-$DSP_n$ increases the output voltage $V_{O1}$-$V_{On}$ of the power supply unit $PSU_1$-$PSU_n$ to increase the output current $I_{O1}$-$I_{On}$. On the contrary, when the controller $DSP_1$-$DSP_n$ determines that the current signal value $V_{IO1}$-$V_{IOn}$ is greater than the reference current sharing signal value $V_{SBREF}$, the controller $DSP_1$-$DSP_n$ decreases the output voltage $V_{O1}$-$V_{On}$ to decrease the output current $I_{O1}$-$I_{On}$ so that the output currents $I_{O1}$-$I_{On}$ of the power supply units $PSU_1$-$PSU_n$ are shared to supply power to the load 90.

Hereinafter, four power supply units $PSU_1$-$PSU_4$ will be taken as examples to illustrate the current sharing operation of the power supply system of the present disclosure. Incidentally, the illustrated embodiment is described by taking the reference current sharing signal value $V_{SBREF}$ as the maximum value of the current sharing signal values $V_{SB1}$-$V_{SBn}$ as an example for description. As shown in Table 2 below, it is the electrical state and condition at a certain moment.

TABLE 2

| power supply unit ($PSU_1$-$PSU_4$) | power supply ratio | current sharing signal value (volts) ($V_{SB1}$-$V_{SB4}$) | output current (amps) ($I_{O1}$-$I_{O4}$) |
| --- | --- | --- | --- |
| $PSU_1$ | 25.1% | $V_{SB1}$ = 4.016 | $I_{O1}$ = 50.2 |
| $PSU_2$ | 24.9% | $V_{SB2}$ = 3.984 | $I_{O2}$ = 49.8 |
| $PSU_3$ | 24.6% | $V_{SB3}$ = 3.936 | $I_{O3}$ = 49.2 |
| $PSU_4$ | 25.4% | $V_{SB4}$ = 4.064 | $I_{O4}$ = 50.8 |

Taking the values listed in Table 2 as an example, at this moment, each power supply unit $PSU_1$-$PSU_4$ provides its own current sharing signal value $V_{SB1}$-$V_{SB4}$ to the current sharing bus SB, and provides output currents $I_{O1}$-$I_{O4}$ to the load 90 corresponding to the current sharing signal values $V_{SB1}$-$V_{SB4}$ (i.e., power supply ratios).

Afterward, each power supply unit $PSU_1$-$PSU_4$ may acquire the current sharing signal values $V_{SB1}$-$V_{SB4}$ of other power supply units $PSU_1$-$PSU_4$ other than itself from the current sharing bus SB. Afterward, each controller $DSP_1$-$DSP_4$ compares the reference current sharing signal value $V_{SBREF}$ (in this embodiment, the maximum value of the current sharing signal values $V_{SB1}$-$V_{SB4}$) and the current signal value $V_{IO1}$-$V_{IO4}$. In essence, each controller $DSP_1$-$DSP_4$ compares whether the output voltages $V_{O1}$-$V_{O4}$ of the corresponding power supply units $PSU_1$-$PSU_4$ are too large or too small. In one embodiment, since this embodiment uses the maximum current sharing signal value as the reference current sharing signal value $V_{SBREF}$, the reference current sharing signal value $V_{SBREF}$ acquired by the first controller $DSP_1$, the second controller $DSP_2$, and the third controller $DSP_3$ is all 4.064 volts. In this condition, the first controller $DSP_1$ determines that the first current signal value $V_{IO1}$ is less than the reference current sharing signal value $V_{SBREF}$, and therefore the first controller $DSP_1$ controls the first power supply unit $PSU_1$ to increase the first output voltage $V_{O1}$ so as to increase the first output current $I_{O1}$. Similarly, the second controller $DSP_2$ determines that the second current signal value $V_{IO2}$ is less than the reference current sharing signal value $V_{SBREF}$, and therefore the second controller $DSP_2$ controls the second power supply unit $PSU_2$ to increase the second output voltage $V_{O2}$ so as to the second output current $I_{O2}$. At this time, the third controller $DSP_3$ also operates in the same way, and details are not repeated here.

In this embodiment, since the reference current sharing signal value $V_{SBREF}$ acquired by the fourth controller $DSP_4$ is 4.016 volts, the fourth controller $DSP_4$ determines that the fourth current signal value $V_{IO4}$ is greater than the reference current sharing signal value $V_{SBREF}$, and therefore the fourth controller $DSP_4$ controls the fourth power supply unit $PSU_4$ to decrease the fourth output voltage $V_{O4}$ so as to decrease the fourth output current $I_{O4}$.

Accordingly, by dynamically adjusting (increasing or decreasing) the output voltages $V_{O1}$-$V_{O4}$ of the power supply units $PSU_1$-$PSU_4$, the output currents $I_{O1}$-$I_{O4}$ are adjusted (increased or decreased) so that the output currents $I_{O1}$-$I_{O4}$ of the power supply units $PSU_1$-$PSU_4$ are shared to supply power to the load 90.

As for the other reference current sharing signal value $V_{SBREF}$, it is the minimum or the average value of the current sharing signal values $V_{SB1}$-$V_{SBn}$, and its operation principle is similar to the spirit of the maximum value. The purpose is also to control the power supply unit to increase its output voltage to increase the output current when the current signal value is less than the reference current sharing signal value; on the contrary, when the current signal value is greater than the reference current sharing signal value, control the power supply unit to decrease its output voltage to decrease the output current. Accordingly, by dynamically adjusting (increasing or decreasing) the output voltages of the power supply units, the output currents are adjusted (increased or decreased) so that the output currents of the power supply units are shared to supply power to the load. Therefore, the principle and operation that the reference current sharing signal value $V_{SBREF}$ is the minimum value or the average value of the current sharing signal values $V_{SB1}$-$V_{SBn}$ will not be repeated here.

In addition, the present disclosure further has each controller $DSP_1$-$DSP_n$ adaptively setting the power supply ratio corresponding to the current sharing signal value $V_{SB1}$-$V_{SBn}$ so as to control the power supply units $PSU_1$-$PSU_n$ to output the corresponding output currents $I_{O1}$-$I_{On}$ according to the power supply ratios, thereby increasing the accuracy of current sharing control.

The first power supply unit $PSU_1$ shown in Table 2 is also taken as an example for description. When the first controller $DSP_1$ determines that the first current signal value $V_{IO1}$ is less than the reference current sharing signal value $V_{SBREF}$ (i.e., 4.064 volts), the first controller $DSP_1$ controls the first power supply unit $PSU_1$ to increase the first output voltage $V_{O1}$ so as to increase the first output current $I_{O1}$ from 50.2 amps to 50.8 amps.

However, due to the difference and non-ideality of the circuit parameters of the power supply units, the power supply ratios corresponding to the current sharing signal values PSU1-PSUn of the power supply units PSU1-PSUn are not exactly identical. Therefore, the power supply ratios corresponding to each current sharing signal values $V_{SB1}$-$V_{SBn}$ are set before the power supply units $PSU_1$-$PSU_n$ leave the factory.

Take this embodiment as an example, when the reference current sharing signal value $V_{SBREF}$ is $V_{SB4}$ (i.e., 4.064 volts), the first output current $I_{O1}$ may not be 50.8 amps, but may be 50.6 amps. Similarly, the second output current $I_{O2}$ may not be 50.8 amps, but may be 50.4 amps; the third output current $I_{O3}$ may not be 50.8 amps, but may be 50.7 amps. Therefore, under the identical reference current sharing signal value $V_{SBREF}$, the first power supply unit $PSU_1$, the second power supply unit $PSU_2$, and the third power supply unit $PSU_3$ output the corresponding output currents according to the corresponding relationship set before leaving the factory. Incidentally, each controller $DSP_1$-$DSP_n$ builds a relationship between the current sharing signal values $V_{SB1}$-$V_{SBn}$ and the power supply ratios through a look-up table.

The power supply system with current sharing of the present disclosure is not only applicable to the identical rated output powers of the power supply units $PSU_1$-$PSU_n$, but also applicable to the different rated output powers of the power supply units $PSU_1$-$PSU_n$. Therefore, if rated output powers of these power supply units $PSU_1$-$PSU_n$ are identical, the output currents $I_{O1}$-$I_{On}$ of the power supply units $PSU_1$-$PSU_n$ are shared in the identical output current to supply power to the load 90 according to the power supply ratios. Similarly, if rated output powers of these power supply units $PSU_1$-$PSU_n$ are different, the output currents $I_{O1}$-$I_{On}$ of the power supply units $PSU_1$-$PSU_n$ are shared in the proportional output current to supply power to the load 90 according to the power supply ratios.

For example, if rated output powers of the two power supply units are 1200 watts to supply power to the load of 1200 watts, each power supply unit provides current sharing power to the load in the identical output current (i.e., 600 watts of output current) at half-loading output. If rated output powers of the two power supply units are respectively 2400 watts and 1200 watts to supply power to the load of 1800 watts, each power supply unit provides current sharing power to the load in the proportional output current (i.e., 1200 watts and 600 watts of output current) at half-loading output. In the spirit of this technology, the current sharing control of multiple power supply units is also applicable, and details are not described here.

Figure 2:
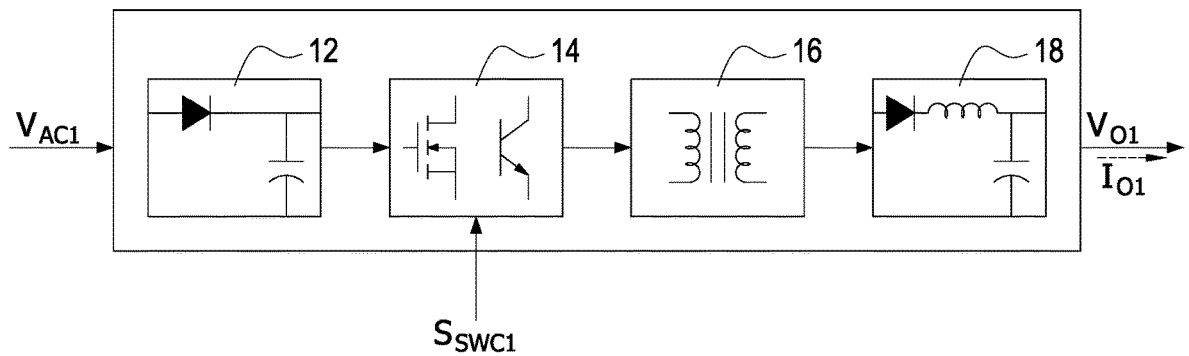
FIG. 2 is a block diagram of a power supply unit of the power supply system with current sharing according to the present disclosure.

Please refer to FIG. 2, which shows a block diagram of a power supply unit of the power supply system with current sharing according to the present disclosure. The block diagram shown in FIG. 2 is only used to represent the main units or circuits of the power supply unit, and is not intended to limit the application of the present disclosure. Therefore, the power supply unit $PSU_1$ mainly includes a rectifying unit 12, a switch unit 14, a transformer 16, and a filtering unit 18. The input power $V_{AC1}$ is received and rectified by the rectifying unit 12, and the energy is coupled to the secondary side of the transformer 16 by switching the switch unit 14 to on and off. Finally, the output voltage $V_{O1}$ and the output current $I_{O1}$ are provided through the filtering unit 18.

In particular, each power supply unit $PSU_1$-$PSU_n$ includes at least one switch component, that is, the switch unit 14 shown in FIG. 2. In the process of current sharing control, when the output voltages $V_{O1}$-$V_{On}$ need to be adjusted to increase or decrease, the controllers $DSP_1$-$DSP_n$ provide switch control signals $S_{SWC1}$-$S_{SWCn}$ to control the switching of the at least one switch component, thereby adjusting the output voltages $V_{O1}$-$V_{On}$ to adjust the output currents $I_{O1}$-$I_{On}$. In particular, each switch control signal $S_{SWC1}$-$S_{SWCn}$ is a pulse-width modulation (PWM) signal.

Figure 3:
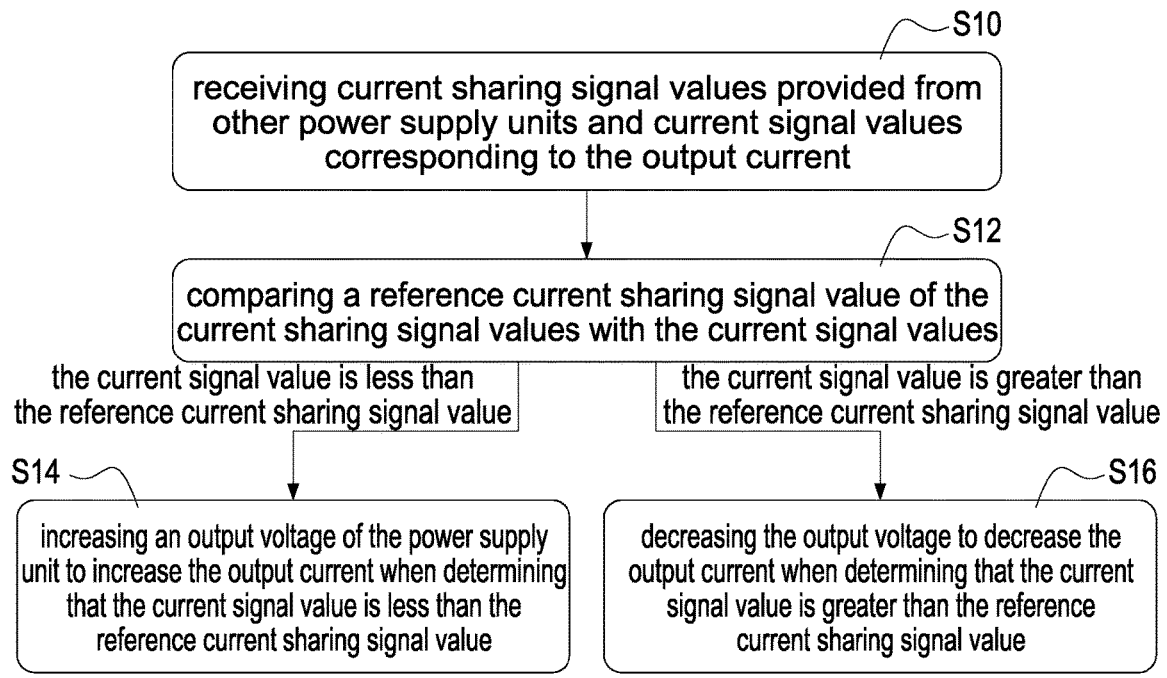
FIG. 3 is a flowchart of a method of current sharing the power supply system with current sharing according to the present disclosure.

Please refer to FIG. 3, which shows a flowchart of a method of current sharing the power supply system with current sharing according to the present disclosure, and also refer to FIG. 1 and corresponding descriptions thereof. The method includes steps of: receive current sharing signal values $V_{SB1}$-$V_{SBn}$ provided from other power supply units $PSU_1$-$PSU_n$ and current signal values $V_{IO1}$-$V_{IOn}$ corresponding to the output current $I_{O1}$-$I_{On}$ (S10). Afterward, comparing a reference current sharing signal value $V_{SBREF}$ of the current sharing signal values $V_{SB1}$-$V_{SBn}$ with the current signal values $V_{IO1}$-$V_{IOn}$ (S12).

Afterward, increasing an output voltage $V_{O1}$-$V_{On}$ of the power supply unit $PSU_1$-$PSU_n$ to increase the output current $I_{O1}$-$I_{On}$ when determining that the current signal value $V_{IO1}$-$V_{IOn}$ is less than the reference current sharing signal value $V_{SBREF}$ (S14). Alternatively, decreasing the output voltage $V_{O1}$-$V_{On}$ to decrease the output current $I_{O1}$-$I_{On}$ when determining that the current signal value $V_{IO1}$-$V_{IOn}$ is greater than the reference current sharing signal value $V_{SBREF}$ (S16).

Since the current sharing control method of the power supply system of the present disclosure has a high degree of correlation and correspondence with the power supply system with current sharing, the current sharing control method will not be described in detail. The principle and implementation of the current sharing control method can be clarified through the description of the power supply system with current sharing.

In summary, the present disclosure has the following features and advantages:

1. By means of bi-directionally adjusting the output voltage (adjusting the output voltage to increase and decrease), it can effectively allow each power supply unit to quickly achieve current sharing.

2. Based on digital software or firmware design, it can effectively solve the disadvantage that the analog operational amplifier will have large error under light-load operation.
3. The power supply ratios corresponding to the current sharing signal values are set (compensated) adaptively, and therefore under the full (wide) range of output voltage, the accuracy of the current sharing control can be increased, which meets the requirement of 2% current sharing.
4. The advantages of fast dynamic response can effectively overcome the instantaneous dynamic high current requirements of the latest CRPS design specifications.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A power supply system with current sharing, comprising:
    a current sharing bus,
    a plurality of power supply units, connected to each other through the current sharing bus; each power supply unit configured to provide a current sharing signal value corresponding to a power supply ratio to the current sharing bus, and provide an output current to a load, and
    a plurality of controllers, respectively coupled to the power supply units; each controller configured to receive current sharing signal values provided from other power supply units and current signal values corresponding to the output currents, and compare a reference current sharing signal value of the current sharing signal values with the current signal values,
    wherein when the controller determines that the current signal value is less than the reference current sharing signal value, the controller increases an output voltage of the power supply unit to increase the output current; when the controller determines that the current signal value is greater than the reference current sharing signal value, the controller decreases the output voltage to decrease the output current so that the output currents of the power supply units are shared to supply power to the load.

2. The power supply system as claimed in claim 1, wherein each controller adaptively sets the power supply ratio corresponding to the current sharing signal value so as to control the power supply unit to output the corresponding output current according to the power supply ratios.

3. The power supply system as claimed in claim 2, wherein each controller adaptively sets the power supply ratio corresponding to the current sharing signal value by software or firmware.

4. The power supply system as claimed in claim 2, wherein the power supply ratio corresponding to the current sharing signal value is set before the power supply unit leaves a factory.

5. The power supply system as claimed in claim 2, wherein each controller builds a relationship between the current sharing signal values and the power supply ratios through a look-up table.

6. The power supply system as claimed in claim 1, wherein if rated output powers of the power supply units are identical, the output currents of the power supply units are shared in an identical output current to supply power to the load according to the power supply ratios.

7. The power supply system as claimed in claim 1, wherein if rated output powers of the power supply units are different, the output currents of the power supply units are shared in a proportional output current to supply power to the load according to the power supply ratios.

8. The power supply system as claimed in claim 1, wherein the reference current sharing signal value is a maximum value, a minimum value, or an average value of the current sharing signal values.

9. The power supply system as claimed in claim 1, wherein the power supply unit comprises at least one switch component,
    wherein the controller provides a switch control signal to control the switching of the at least one switch component to increase or decrease the output voltage.

10. The power supply system as claimed in claim 9, wherein the switch control signal is a pulse-width modulation signal.

11. A method of current sharing a power supply system, wherein the power supply system comprises a current sharing bus and a plurality of power supply units connected to each other through the current sharing bus, each power supply unit configured to provide a current sharing signal value corresponding to a power supply ratio to the current sharing bus, and provide an output current to a load, the method comprising steps of:
    receiveing current sharing signal values provided from other power supply units and current signal values corresponding to the output currents,
    comparing a reference current sharing signal value of the current sharing signal values with the current signal values,
    increasing an output voltage of the power supply unit to increase the output current when determining that the current signal value is less than the reference current sharing signal value, and
    decreasing the output voltage to decrease the output current when determining that the current signal value is greater than the reference current sharing signal value.

12. The method as claimed in claim 11, further comprising a step of:
    adaptively setting the power supply ratio corresponding to the current sharing signal value so as to control the power supply unit to output the corresponding output current according to the power supply ratios.

13. The method as claimed in claim 12, wherein adaptively setting the power supply ratio corresponding to the current sharing signal value by software or firmware.

14. The method as claimed in claim 13, wherein the power supply ratio corresponding to the current sharing signal value is set before the power supply unit leaves the factory.

15. The method as claimed in claim 11, further comprising a step of:
    sharing the output currents of the power supply units in an identical output current to supply power to the load according to the power supply ratios if rated output powers of the power supply units are identical.

16. The method as claimed in claim 11, further comprising a step of:
    sharing the output currents of the power supply units in a proportional output current to supply power to the load according to the power supply ratios if rated output powers of the power supply units are different.

17. The method as claimed in claim 11, wherein the reference current sharing signal value is a maximum value, a minimum value, or an average value of the current sharing signal values.

18. The method as claimed in claim 11, wherein the power supply unit comprises at least one switch component, and the method further comprises a step of:
   providing a switch control signal to control the switching of the at least one switch component to increase or decrease the output voltage.

\* \* \* \* \*